(12) United States Patent
Maeda

(10) Patent No.: US 10,319,958 B2
(45) Date of Patent: Jun. 11, 2019

(54) PACKAGING MATERIAL FOR POWER STORAGE DEVICE

(71) Applicant: TOPPAN PRINTING CO., LTD., Tokyo (JP)

(72) Inventor: Hideyuki Maeda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 33 days.

(21) Appl. No.: 15/719,163

(22) Filed: Sep. 28, 2017

(65) Prior Publication Data

US 2018/0019449 A1    Jan. 18, 2018

Related U.S. Application Data

(63) Continuation of application No. PCT/JP2016/060227, filed on Mar. 29, 2016.

(30) Foreign Application Priority Data

Mar. 30, 2015   (JP) .................................. 2015-068334

(51) Int. Cl.
*H01M 2/02* (2006.01)
*H01M 2/08* (2006.01)
(Continued)

(52) U.S. Cl.
CPC ............ *H01M 2/0292* (2013.01); *B32B 15/08* (2013.01); *H01G 11/78* (2013.01); *H01G 11/80* (2013.01);
(Continued)

(58) Field of Classification Search
CPC combination set(s) only.
See application file for complete search history.

(56) References Cited

U.S. PATENT DOCUMENTS

2006/0093906 A1*  5/2006  Yamashita .............. B32B 15/08
                                                                              429/176
2010/0036044 A1*  2/2010  Tomioka ............ C08G 18/2825
                                                                              524/507
(Continued)

FOREIGN PATENT DOCUMENTS

CN          103931013 A        7/2014
CN          205705574 U       11/2016
(Continued)

OTHER PUBLICATIONS

International Search Report and Written Opinion, PCT/JP2016/060227, Toppan Printing Co., Ltd., 7 pages (dated Jul. 5, 2016).
(Continued)

*Primary Examiner* — Kaity V Chandler
(74) *Attorney, Agent, or Firm* — Foley & Lardner LLP

(57) ABSTRACT

A packaging material for a power storage device, including: a metal foil layer; a coating layer formed on a first surface of the metal foil layer directly or via a first anti-corrosion treatment layer; a second anti-corrosion treatment layer formed on a second surface of the metal foil layer; an adhesive layer formed on the second anti-corrosion treatment layer; and a sealant layer formed on the adhesive layer. The coating layer contains at least one material selected from a group consisting of fluorine-based resins, urethane-based resins, and polyester-based resins. There is also a strength difference between the coating layer and a laminate of the adhesive layer and the sealant layer at a 10 percent stretch conducted in a tensile test (in conformity with JIS K 7127) of less than 0.400 N/mm.

4 Claims, 2 Drawing Sheets

(51) Int. Cl.
*H01M 10/0525* (2010.01)
*B32B 15/08* (2006.01)
*H01G 11/78* (2013.01)
*H01G 11/80* (2013.01)
*H01M 10/052* (2010.01)

(52) U.S. Cl.
CPC ....... *H01M 2/0275* (2013.01); *H01M 2/0277* (2013.01); *H01M 2/0285* (2013.01); *H01M 2/0287* (2013.01); *H01M 2/08* (2013.01); *H01M 2/0267* (2013.01); *H01M 10/052* (2013.01); *H01M 10/0525* (2013.01); *Y02E 60/13* (2013.01)

(56) References Cited

U.S. PATENT DOCUMENTS

| | | | | |
|---|---|---|---|---|
| 2012/0135301 | A1* | 5/2012 | Akita | H01M 2/0212 429/185 |
| 2013/0149597 | A1* | 6/2013 | Suzuta | H01M 2/0287 429/175 |
| 2014/0242333 | A1* | 8/2014 | Oono | B32B 15/095 428/141 |
| 2014/0335403 | A1 | 11/2014 | Akita et al. | |
| 2015/0030910 | A1* | 1/2015 | Minamibori | H01M 2/1094 429/163 |
| 2015/0083222 | A1* | 3/2015 | Kwon | H01L 31/049 136/259 |
| 2015/0104698 | A1* | 4/2015 | Fung | H01M 2/0285 429/175 |
| 2015/0183922 | A1* | 7/2015 | Nakagawa | C08G 18/6279 136/256 |
| 2015/0214515 | A1* | 7/2015 | Lai | H01M 2/0287 429/163 |
| 2015/0380692 | A1* | 12/2015 | Ojiri | B32B 7/02 429/176 |
| 2017/0047561 | A1* | 2/2017 | Dai | B32B 15/00 |
| 2017/0141362 | A1* | 5/2017 | Ijuin | H01G 11/78 |
| 2017/0152418 | A1* | 6/2017 | Aoyama | C09J 4/00 |
| 2018/0019449 | A1 | 1/2018 | Maeda | |
| 2018/0069204 | A1* | 3/2018 | Sato | H01M 2/0275 |
| 2018/0076421 | A1* | 3/2018 | Ogihara | H01G 11/78 |

FOREIGN PATENT DOCUMENTS

| | | |
|---|---|---|
| JP | 3567230 B | 9/2004 |
| JP | 4559547 B | 10/2010 |
| JP | 2012-009314 A | 1/2012 |
| JP | 2013-118083 A | 6/2013 |
| JP | 2014-069384 A | 4/2014 |
| JP | 2015-135739 A | 7/2015 |
| JP | 2016-068391 A | 5/2016 |
| WO | WO 2015/041281 A1 | 3/2015 |

OTHER PUBLICATIONS

Chinese Office Action dated Feb. 25, 2019 in corresponding application No. 201610187407.9.

* cited by examiner

PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. § § 120 and 365(c) of International Application No. PCT/JP2016/060227, filed on Mar. 29, 2016, which is based upon and claims the benefit of priority of Japanese Patent Application No. 2015-068334, filed on Mar. 30, 2015, the entireties of which are hereby incorporated by reference.

TECHNICAL FIELD

The present invention relates to a packaging material for a power storage device.

BACKGROUND

Secondary batteries and electrochemical capacitors are known as power storage devices. For example, secondary batteries include lithium ion secondary batteries, nickel hydrogen batteries, or lead storage batteries. Electrochemical capacitors include electric double layer capacitors. Due to size reduction of cellular phones, or restriction of installation spaces, for example, power storage devices are desired to be made much smaller. Accordingly, lithium ion batteries with high energy density are gathering attention. As packaging materials for lithium ion batteries, metal cans have conventionally been used. However, a recent trend is to use multi-layer films as such packaging materials, which are lightweight, have high heat dissipation, and can be produced at low cost.

The electrolytic solution of such a lithium ion secondary battery is configured by an aprotic solvent, such as propylene carbonate, ethylene carbonate, dimethyl carbonate, diethyl carbonate, or ethyl methyl carbonate, and an electrolyte. As the electrolyte, a lithium salt, such as LiPF6 or LiBF4, is used. However, these lithium salts generate hydrofluoric acid by a hydrolysis reaction. The hydrofluoric acid may corrode the metal surface of the battery member, or degrade the lamination strength between the layers of the multi-layer film serving as a packaging material.

To address such corrosion and degradation, the aforementioned packaging material is provided with an aluminum foil or the like as a barrier layer on the inside of the multi-layer film to prevent penetration of moisture from the surface of the multi-layer film. A multi-layer film known as the aforementioned packaging material includes, for example, a heat resistant base material layer, a first adhesive layer, a barrier layer, an anti-corrosion treatment layer preventing corrosion due to hydrofluoric acid, a second adhesive layer, and a sealant layer, which are laminated in this order. A lithium ion secondary battery using a packaging material provided with an aluminum foil as a barrier layer, as mentioned above, is also referred to as an aluminum laminate type lithium ion secondary battery.

For example, the aluminum laminate type lithium ion secondary battery can be obtained by a method of cold forming a recess on part of a packaging material, accommodating battery elements, such as a positive electrode, a separator, a negative electrode, and an electrolytic solution, in the recess, folding back the rest of the packaging material, and bonding the edge portions by heat sealing. Such a lithium ion secondary battery is also referred to as an embossed lithium ion secondary battery. To enhance energy density, the embossed lithium ion secondary batteries manufactured in recent years are provided with recesses on both sides of the packaging material to be bonded to accommodate more battery elements.

The energy density of such a lithium ion secondary battery increases more, as a recess formed by cold forming becomes deeper. However, as the recess formed becomes deeper, pinholes or breakage are more likely to occur in the packaging material during forming. As a measure against this, a stretched film is used for the base material layer of the packaging material to protect the metal foil (e.g. see PTLs 1 and 2).

CITATION LIST

Patent Literature

PTL 1: JP 3567230 B
PTL 2: JP 4559547 B

SUMMARY OF THE INVENTION

Technical Problem

In the technique of PTL 1, a stretched polyamide film or a stretched polyester film having a tensile strength and an elongation ratio of not less than the specified values is used as a base material layer to improve formability. However, when a stretched polyamide film is used as a base material layer, and the electrolytic solution is adhered to the stretched polyamide film in the process of injection thereof, for example, the stretched polyamide film may melt. To cope with this, another proposed packaging material uses a base material layer in which a stretched polyester film is further laminated on the outer side of the stretched polyamide film (PTL 2). However, this type of packaging material does not necessarily exhibit good formability.

When such a packaging material is deep drawn to form a recess, the packaging material after forming may be warped toward the base material layer side. This tendency is particularly noticeable when producing a one-sided battery. Warpage of the packaging material is considered to occur when the packaging material is formed while being stretched, due to recovery of the stretched base material layer to the original state. With the packaging material obtained in PTL 1 or 2, it is difficult to solve the warpage problem.

Warpage after forming can be a factor of causing a suction failure when the packaging material is sucked and conveyed to a subsequent step, or can be a factor causing heat sealing failure in a subsequent step.

The present invention has been made in light of the circumstances set forth above and has an object to provide a packaging material for a power storage device, which is unlikely to cause deterioration in the outer surface even when the electrolytic solution is attached thereto, and retains good formability, while reducing warpage after forming.

Solution to Problem

The inventor of the present invention specifically has addressed the warpage problem as follows. That is, in the packaging material of PTL 1 or 2, a base material layer using a polyester film, polyamide film, or the like is arranged on a surface of a metal foil layer, and a thermal adhesive resin layer such as of an acid-modified polyolefin resin or the like is arranged on the other surface of the metal foil layer, so that the metal foil layer is sandwiched between the base material layer and the thermal adhesive resin layer. Tensile tests reveal that the base material layer can exhibit a quite larger tensile strength in an elastic range, compared with the thermal adhesive resin layer. The elastic range refers to a range in which the layer recovers to the original length when unloaded. Accordingly, the force of recovery to the original state is greater on the base material layer side than on the thermal adhesive resin layer side, against the stretching force during forming, and thus the warpage problem is caused. Based on the findings, the inventor has conceived of the present invention.

The present invention provides a packaging material for a power storage device, including: a metal foil layer; a coating layer formed on a first surface of the metal foil layer directly or via a first anti-corrosion treatment layer; a second anti-corrosion treatment layer formed on a second surface of the metal foil layer; an adhesive layer formed on the second anti-corrosion treatment layer; and a sealant layer formed on the adhesive layer. In the packaging material: the coating layer contains at least one material selected from a group consisting of fluorine-based resins, urethane-based resins, and polyester-based resins; and a strength difference between the coating layer and a laminate of the adhesive layer and the sealant layer at a 10 percent stretch conducted in a tensile test (in conformity with JIS K 7127) is less than 0.400 N/mm.

According to the present invention, the packaging material for a power storage device is unlikely to be deteriorated even when electrolytic solution is adhered to the outer surface thereof, and good formability is retained. At the same time, warpage after forming is reduced.

In the present invention, the coating layer preferably has a thickness in a range of 3 to 30 μm. Thus, the strength difference between the single coating layer and the sealant layer at a 10 percent stretch conducted in a tensile test can be made much smaller, while retaining formability. Thus, warpage after forming is further reduced.

In the present invention, the sealant layer is preferably made of a polyolefin-based resin. Also, a total thickness of the adhesive layer and the sealant layer is preferably two to eight times the thickness of the coating layer.

In the present invention, preferably, the fluorine-based resin is a tetrafluoro fluororesin cured with an isocyanate curing agent, and an isocyanate group (—NCO) functional group equivalent per molecule of the curing agent is in a range of 1,000 to 5,000. Alternatively, in the present invention, the urethane-based resin is obtained using a urethane (meth)acrylate oligomer having a functional group equivalent of a (meth)acryloyl group per molecule in a range of 1,000 to 5,000. Thus, warpage after forming can be further reduced, while retaining formability and electrolytic solution resistance.

Advantageous Effects of Invention

The present invention provides a packaging material for a power storage device which is unlikely to be deteriorated even when an electrolytic solution is adhered to the outer surface thereof, and retains good formability, while reducing warpage after forming. In the conventional methods using a stretched film, it has been necessary to provide an adhesive layer between the stretched film and the barrier layer. However, the present invention does not necessarily require such an adhesive layer, and hence cost reduction and thickness reduction can both be achieved.

DESCRIPTION OF REPRESENTATIVE EMBODIMENTS

In the following, representative embodiments of the present invention will be described in detail. However, it is to be understood that the present invention should not be construed as being limited to the present embodiments below.

[Packaging Material]

Figure 1:
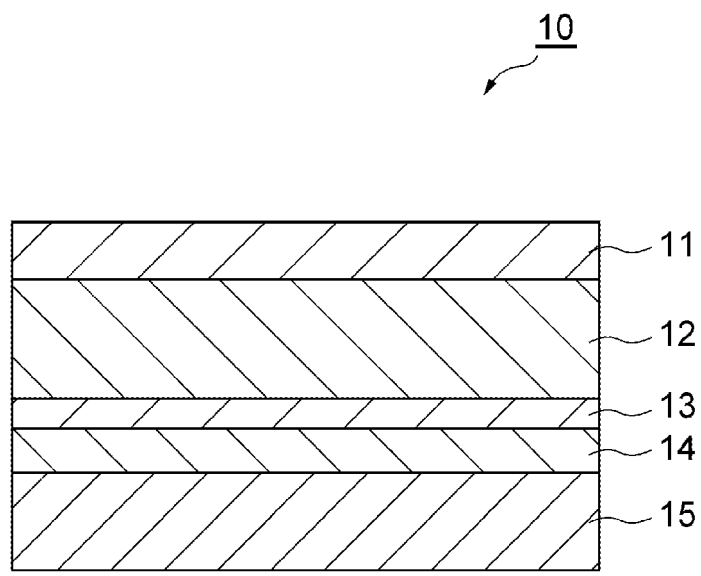
FIG. 1 is a schematic cross-sectional view of a packaging material for a power storage device, according to an embodiment of the present invention.

A packaging material for a power storage device according to an embodiment of the present invention will be described. FIG. 1 is a schematic cross-sectional view showing a packaging material for a power storage device according to an embodiment of the present invention (hereinafter simply referred to as packaging material 10). As shown in FIG. 1, the packaging material 10 includes a metal foil layer 12 serving as a barrier, a coating layer 11 formed on a first surface of the metal foil layer 12, and an anti-corrosion treatment layer 13 formed on a second surface of the metal foil layer 12 on a side opposite to the first surface, and includes an adhesive layer 14 and a sealant layer 15 sequentially laminated on the anti-corrosion treatment layer 13. When forming a power storage device using the packaging material 10, the coating layer 11 is the outermost layer, and the sealant layer 15 is the innermost layer. In the following, the layers configuring the packaging material 10 will be described in detail.

(Coating Layer)

When producing a power storage device, the coating layer 11 provides the packaging material 10 with heat resistance exerted during heat sealing, and electrolytic solution resistance for allowing the packaging material 10 to resist deterioration even when the electrolytic solution is attached thereto. Also, when the packaging material 10 is processed or distributed, the coating layer 11 reduces possible occurrence of pinholes.

The coating layer 11 is formed so that a tensile test of a 10 percent stretch results in a strength difference of less than 0.400 N/mm, between the coating layer (single-layer film) and the laminate of the adhesive and sealant layers. The tensile test in this case is in conformity with JIS K 7127 (former JIS K 7113-2), i.e. measurement environment of 23° C. and 50 RH, sample width of 6 mm, gauge length of 35 mm, and tensile speed of 50 mm/min.

When the strength difference between the single coating layer and the laminate of the adhesive and sealant layers with a 10 percent stretch is reduced to less than 0.400 N/mm, the recovery forces of the two layers against the stretching force during forming are similar to each other, and hence warpage after forming is reduced. From the viewpoint of more easily reducing warpage, the strength difference is preferably less than 0.350 N/mm, and more preferably less than 0.300 N/mm. The lower limit of the strength difference is not specifically limited, but is preferably 0.200 N/mm.

The coating layer may be a layer that contains a urethane-based resin, fluorine-based resin, polyester-based resin, polyolefin-based resin, epoxy-based resin, polyvinyl chloride resin, or the like. The coating layer used in the present embodiment specifically contains at least one material selected from the group consisting of fluorine-based resins, urethane-based resins, and polyester-based resins. The polyester-based resin may be an amorphous polyester resin, and the urethane resin-based may be a urethane (meth)acrylate resin.

In the present embodiment, the coating layer is made of a tetrafluoro fluororesin obtained by curing a fluorine-based resin with an isocyanate curing agent. An isocyanate group (—NCO) functional group equivalent per molecule of the curing agent is preferably in the range of 1,000 to 5,000, and more preferably 1,200 to 4,000. In the present embodiment, the urethane-based resin preferably contains a urethane (meth)acrylate oligomer in which the functional group equivalent of a (meth)acryloyl group per molecule is in the range of 1,000 to 5,000, and preferably 1,100 to 3,500. When a urethane-based resin is used in the present embodiment, the coating layer may be obtained by applying and drying a water-dispersed polyurethane resin. Alternatively, when a polyester-based resin is used, the coating layer may be obtained by applying and drying a water-dispersed polyester resin.

If the functional group equivalent is less than 1,000, the fluorine-based resin or the urethane-based resin cured with an isocyanate curing agent is likely to have high rigidity to deteriorate flexibility, and formability is likely to be reduced.

If the functional group equivalent exceeds 5,000, the fluorine-based resin or the urethane-based resin cured with an isocyanate curing agent is likely to be improved in flexibility, but crosslink density is reduced, and hence electrolytic solution resistance is likely to be reduced.

The urethane (meth)acrylate oligomer may be obtained by reaction of a polyol, a polyisocyanate, and a hydroxy (meth)acrylate. The coating layer 11 is formed by applying an active energy ray curable resin composition at least containing a urethane (meth)acrylate oligomer and a photopolymerization initiator, to a metal foil layer, followed by irradiation of active energy rays. The coating layer 11 is directly formed on the first surface of the metal foil layer 12 without being provided with an adhesive and the like therebetween.

The polyol can include a polyester polyol, polyether polyol, polycarbonatepolyol, polycaprolactone polyol, a ring-opening tetrahydrofuran-propyleneoxide copolymer, ethylene glycol, propylene glycol, 1,4-butanediol, 1,5-pentane diol, 1,6-hexanediol, neopentyl glycol, 1,4-cyclohexane dimethanol, adipic acid polytetramethylene glycol, or diol of bisphenol A. Among them, a polyol containing a repeating unit of —CH2CH2O— or —CH2CH(CH3)O— is more preferable.

The polyisocyanate is a compound having two or more isocyanate groups. Examples of the polyisocyanate include tolylenediisocyanate, diphenyl methane diisocyanate, hydrogenated diphenyl methane diisocyanate, hexamethylenediisocyanate, isophorone diisocyanate, xylylene diisocyanate, hydrogenated xylylene diisocyanate, tetramethylxylylene diisocyanate, trimethylhexamethylenediisocyanate, 1,5-naphthalene diisocyanate, norbornene diisocyanate, tolidine diisocyanate, p-phenylene diisocyanate, and lysine diisocyanate.

The hydroxy (meth)acrylate contains one or more (meth) acryloyl groups and hydroxy groups. As the hydroxy (meth) acrylate, mention can be made of 2-hydroxyethyl (meth) acrylate, 2-hydroxypropyl (meth)acrylate, 2-hydroxybutyl (meth)acrylate, 2-hydroxy-3-phenyloxypropyl (meth)acrylate, 4-hydroxybutyl acrylate, neopentyl glycol mono(meth) acrylate, trimethylolpropane tri(meth)acrylate, pentaerythritol tri(meth)acrylate, or dipentaerythritol tetra(meth) acrylate.

The active energy ray curable resin composition may further contain a resin different from the urethane (meth) acrylate oligomer, i.e. may contain a (meth)acrylate monomer, a photopolymerization initiator, a silane coupling agent, or the like.

With the irradiation of active energy rays, the aforementioned photopolymerization initiator exerts an effect of initiating polymerization of a urethane (meth)acrylate oligomer with a (meth)acrylate monomer. Photopolymerization initiators that can be used include: 4-dimethyl aminobenzoic acid, 4-dimethyl aminobenzoic acid ester, 2,2-dimethoxy-2-phenyl acetophenone, acetophenone diethyl ketal, alkoxy acetophenone, benzil dimethyl ketal and benzophenone, and benzophenone derivatives such as 3,3-dimethyl-4-methoxybenzophenone, 4,4-dimethoxy benzophenone and 4,4-diamino benzophenone; benzoylbenzoic acid alkyl, bis(4-dialkylaminophenyl) ketone and benzil, and benzil derivatives such as benzil methyl ketal; benzoin, and benzoin derivatives such as benzoin isobutyl ether; and benzoin isopropyl ether, 2-hydroxy-2-methyl propiophenone, 1-hydroxycyclohexylphenylketone, xanthone, thioxanthone, thioxanthone derivatives, fluorene, 2,4,6-trimethylbenzoyl diphenylphosphine oxide, bis(2,6-dimethoxy benzoyl)-2,4, 4-trimethylpentyl phosphine oxide, bis(2,4,6-trimethylbenzoyl)-phenylphosphine oxide and 2-methyl-1-[4-(methylthio)phenyl]-2-morpholinopropane-1,2-benzil-2-dimethylamino-1-(morpholinophenyl)-butanone-1.

The silane coupling agent is a silane compound having an organic functional group and a hydrolyzable group. When the active energy ray curable resin composition contains a silane coupling agent, the interfacial adhesion strength between the coating layer 11 and the metal foil layer 12 can be further improved. The silane coupling agent is not specifically limited as long as the silane coupling agent can contribute to improving adhesion to the metal foil layer 12. Examples of the silane coupling agent include organic functional group-containing silane coupling agents, such as a vinyl group-containing silane coupling agent, an epoxy group-containing silane coupling agent, a styryl group-containing silane coupling agent, a methacryl group-containing silane coupling agent, an acryloyl group-containing silane coupling agent, an amino group-containing silane coupling agent, a ureido group-containing silane coupling agent, a mercapto group-containing silane coupling agent, a sulfide group-containing silane coupling agent, an isocyanate group-containing silane coupling agent, and an allyl group-containing silane coupling agent. From the viewpoint of improving adhesion, the silane coupling agent is preferably a methacryl group-containing silane coupling agent or an acryloyl group-containing silane coupling agent.

Examples of the hydrolyzable group in the silane coupling agent include an alkoxy group, such as a methoxy group and an ethoxy group, having 1 to 6 carbons, an acetoxy group, and a 2-methoxyethoxy group.

Examples of the methacryl group-containing silane coupling agent include 3-methacryloxypropylmethyldimethoxysilane, 3-methacryloxypropyltrimethoxysilane, 3-methacryloxypropylmethyldiethoxysilane and 3-methacryloxypropyltriethoxysilane. Examples of the acryloyl group-containing silane coupling agent include 3-acryloxypropyltrimethoxysilane.

When the active energy ray curable resin composition contains a resin different from the urethane (meth)acrylate oligomer, a (meth)acrylate monomer, a photopolymerization initiator, or a silane coupling agent, the content is preferably as follows. The content of the resin different from the urethane (meth)acrylate oligomer is preferably 5 to 30 mass % relative to the total amount of the active energy ray curable resin composition. The content of the (meth)acrylate monomer is preferably 50 to 95 mass % relative to the total amount of the active energy ray curable resin composition. The content of the photopolymerization initiator is preferably 1 to 10 mass % relative to the total amount of the urethane (meth)acrylate. The content of the silane coupling agent is preferably 0.5 to 10 mass % relative to the total amount of the active energy ray curable resin composition.

The active energy rays that can be irradiated to the coating layer 11 includes ultraviolet rays emitted from light sources, such as a xenon lamp, low-pressure mercury lamp, high-pressure mercury lamp, ultra-high-pressure mercury lamp, metal halide lamp, carbon-arc lamp and tungsten lamp, and electron beams extracted from a typical 20 to 2,000 kV particle accelerator, α rays, β rays, γ rays, and the like.

The conditions for irradiating active energy rays are not specifically limited, and can be appropriately determined as necessary. However, the conditions are preferably determined to be a normal light integral of 100 mJ/cm2 or more, and more preferably, 300 mJ/cm2 or more.

As examples of the fluorine-based resin, mention can be made of: tetrafluoro fluororesins, such as polytetrafluoroethylene, a tetrafluoroethylene-ethylene copolymer, and a tetrafluoroethylene-vinyl copolymer; trifluoro resins, such as polychlorotrifluoroethylene, a chlorotrifluoroethylene-ethylene copolymer, and a chlorotrifluoroethylene-vinyl copolymer; difluoro resins, such as polyvinylidene fluoride; and other fluororesins, such as a tetrafluoroethylene-perfluoroalkyl vinyl ether copolymer, a tetrafluoroethylene-hexafluoropropylene copolymer, and polyvinyl fluoride. Among them, a tetrafluoro fluororesin having good electrolytic solution resistance is preferable because of its stable structure, and a tetrafluoroethylene-vinyl copolymer imparted with solvent solubility is more preferable. These fluorine-based resins can be used alone or in combination.

These fluorine-based resins are preferably cured with an isocyanate curing agent. Using isocyanate as a curing agent for these resins, heat resistance of the coating film (coating layer) is improved, and the cross-linked structure becomes dense to thereby increase film strength of the coating layer and retain better formability.

As examples of the isocyanate, mention can be made of: aliphatic isocyanates, such as methyl isocyanate, hexamethylenediisocyanate and isophorone diisocyanate; and aromatic isocyanates, such as diphenyl methane diisocyanate and tolylenediisocyanate. These isocyanates can be used alone or in combination. The isocyanate preferably contains an aromatic isocyanate from among the above, which is likely to improve the strength of the coating film (coating layer), and more preferably specifically contains tolylenediisocyanate. Aromatic isocyanates have higher reactivity than do the aliphatic isocyanates. Thus, when using an aromatic isocyanate, reactions should be completed to some extent by the stage of applying the coating layer and drying the solvent. Accordingly, blocking is unlikely to occur even when the packaging material is taken up immediately after being dried. However, when using diphenyl methane diisocyanate from among the aromatic isocyanates, pot life is likely to be shortened because of the excessively high reactivity, and accordingly it will be difficult to spend a long time for coating. When the isocyanate contains tolylenediisocyanate, from the viewpoint of more easily making the aforementioned effects apparent, the content of the isocyanate group due to tolylenediisocyanate in the isocyanate is preferably in the range of 50 to 100 mass %, and more preferably 60 to 90 mass %.

The thickness of the coating layer 11 is preferably in the range of 3 to 30 μm, and more preferably 5 to 20 μm. In the present embodiment, the coating layer 11 is directly formed on the metal foil layer 12, and no adhesive layer is necessary therebetween. Thus, the cost for the adhesive layer can be saved. When the coating layer 11 has a thickness of 20 μm or less, a packaging material thinner than conventional ones can be easily formed.

The total thickness of the adhesive layer 14 and the sealant layer 15 is preferably two to eight times the thickness of the coating layer 11 (total thickness of the adhesive layer and the sealant layer/thickness of the coating layer). Thus, the amount of warpage of the packaging material after forming can be decreased.

(Metal Foil Layer)

Various metal foils, such as aluminum or stainless steel, can be used for the metal foil layer 12. From the viewpoint of moisture resistance, processability, such as ductility and malleability, and cost, the metal foil is preferably an aluminum foil. Generally-used soft aluminum foils can be used as the aluminum foil. Among them, an aluminum foil containing iron is preferably used because of having good pinhole resistance, and good ductility and malleability in forming.

The content of iron in an aluminum foil (100 mass %) containing iron is preferably in the range of 0.1 to 9.0 mass %, and more preferably 0.5 to 2.0 mass %. When the content of iron is 0.1 mass % or more, the packaging material 10 is likely to have good resistance to pinholes, and good ductility and malleability. When the content of iron is 9.0 mass % or less, the packaging material 10 is likely to have good flexibility.

From the viewpoint of barrier properties, resistance to pinholes, and processability, the thickness of the metal foil layer 12 is preferably in the range of 9 to 200 μm, and more preferably 15 to 100 μm.

(Anti-corrosion Treatment Layer)

The anti-corrosion treatment layer 13 prevents corrosion of the metal foil layer 12 caused by the electrolyte solution, or by hydrofluoric acid generated by reaction of the electrolyte solution with moisture.

The anti-corrosion treatment layer 13 is preferably formed of a coating- or immersion-type acid-resistant anticorrosive agent. Such an anti-corrosion treatment layer exerts good effects of preventing corrosion of the metal foil layer 12 due to acid.

Examples of the anticorrosive agent include a ceria sol treatment anticorrosive agent made of ceric oxide, phosphate, and various thermosetting resins, a chromate treatment anticorrosive agent made of chromate, phosphate, fluoride, and various thermosetting resins, and the like.

The anti-corrosion treatment layer 13 is not limited to the ones mentioned above as long as the metal foil layer 12 can have sufficient corrosion resistance. For example, the anti-corrosion treatment layer 13 may be formed by phosphate treatment, boehmite treatment, or the like.

The anti-corrosion treatment layer 13 may be formed of one layer or a plurality of layers. The anti-corrosion treatment layer 13 may contain an additive, such as a silane coupling agent.

From the viewpoint of anti-corrosion and anchoring, the thickness of the anti-corrosion treatment layer 13 is preferably in the range of 10 nm to 5 μm, and more preferably 20 to 500 nm.

(Adhesive Layer)

The adhesive layer 14 bonds the metal foil layer 12 formed with the anti-corrosion treatment layer 13 to the sealant layer 15. The packaging material 10 is broadly categorized into two configurations, i.e. a thermal laminate configuration and a dry laminate configuration, depending on the adhesive component forming the adhesive layer 14.

The adhesive component (adhesive resin) forming the adhesive layer 14 in a thermal laminate configuration is preferably an acid-modified polyolefin resin obtained by graft-modifying a polyolefin-based resin with an acid, such as maleic anhydride. The acid-modified polyolefin resin has a polar group which is introduced to part of the polyolefin-based resin that is nonpolar. Thus, in the case of using a nonpolar layer formed of a polyolefin-based resin film or the like as the sealant layer 15, and of using a polar layer as the anti-corrosion treatment layer 13, the adhesive layer 14 can be firmly adhered to both of these layers. Using the acid-modified polyolefin resin, resistance to the contents, such as the electrolyte solution, is likely to be improved, and degradation of the adhesion of the sealant adhesive layer 14 is likely to be easily prevented even when the hydrofluoric acid is generated on the inside of the battery.

The acid-modified polyolefin resin used for the adhesive layer 14 may be used alone, or two or more acid-modified polyolefin resins may be used in combination.

Examples of the polyolefin-based resin used for the acid-modified polyolefin resin include: a low-, medium- or high-density polyethylene; an ethylene-α-olefin copolymer; polypropylene; a block or random copolymer containing propylene as a copolymerization component; and a propylene-α-olefin copolymer. The polyolefin resin may also be a copolymer obtained by copolymerizing a polar molecule, such as acrylic acid or methacrylic acid, with any of the aforementioned polyolefin resins, or a polymer, such as a cross-linked polyolefin.

The acid used for modifying the polyolefin-based resin may be carboxylic acid, an epoxy compound, or acid anhydride. Maleic anhydride is preferable.

In the case of a thermal laminate configuration, the adhesive layer 14 can be formed by extruding the aforementioned adhesive component by use of an extruder.

The adhesive component of the adhesive layer 14 in a dry laminate configuration may, for example, be a two-part curable type polyurethane adhesive, in which a bifunctional or more aromatic or aliphatic isocyanate compound as a curing agent is reacted with a base resin, such as polyester polyol, polyether polyol, or acrylic polyol.

However, when such a two-part curable type polyurethane adhesive is used, the adhesive layer 14 is very likely to have a highly hydrolysable binding site, such as an ester group or a urethane group. Thus, the adhesive layer 14 in a thermal laminate configuration is preferably used for those applications which are desired to have much higher reliability.

The adhesive layer 14 in a dry laminate configuration can be formed by applying the adhesive component to the anti-corrosion treatment layer 13, followed by drying. When a polyurethane adhesive is used, the polyurethane adhesive is applied to the anti-corrosion treatment layer 13, followed by aging at 40° C. for 4 days or more, for example. This advances the reaction of the hydroxyl group of the base resin with the isocyanate group of the curing agent to achieve firm adhesion.

From the viewpoint such as of adhesion, followability or processability, the thickness of the adhesive layer 14 is preferably in the range of 2 to 50 µm, and more preferably 3 to 20 µm.

(Sealant Layer)

The sealant layer 15 imparts sealability to the packaging material 10 when heat-sealed. The sealant layer 15 may be a resin film made of a polyolefin-based resin, or an acid-modified polyolefin resin obtained by graft-modifying the polyolefin-based resin with a maleic anhydride or the like. Since heat resistance or heat sealing strength of the heat-sealed portion is improved, a polyolefin-based resin is preferable.

Examples of the polyolefin-based resin include: a low-, medium- or high-density polyethylene; an ethylene-α-olefin copolymer; a polypropylene; a block or random copolymer containing propylene as a copolymerization component; and a propylene-α-olefin copolymer. These polyolefin-based resins may be used alone, or in combination of two or more.

Examples of the acid used for modifying the polyolefin-based resin include ones similar to the ones mentioned in the section of the adhesive layer 14.

The sealant layer 15 may be a single-layer film, or may be a multi-layer film, and may be suitably selected according to necessary functions. For example, from the viewpoint of imparting moisture resistance to the packaging material, a multi-layer film can be used, in which a resin, such as an ethylene-cyclic olefin copolymer or polymethylpentene, is provided between layers.

The sealant layer 15 may contain various additives, such as a fire retardant, slip additive, anti-blocking agent, antioxidant, light stabilizer, and tackifier.

From the viewpoint of securing insulation properties, the thickness of the sealant layer 15 is preferably in the range of 10 to 100 µm, and more preferably 20 to 60 µm.

The packaging material 10 may be one in which the sealant layer 15 is laminated by dry lamination. However, from the viewpoint of improving adhesiveness, for example, the packaging material 10 may be one in which the sealant layer 15 is laminated by sandwich lamination using an acid-modified polyolefin resin as the adhesive layer 14, or may be one in which the adhesive layer 14 and the sealant layer 15 are laminated by being simultaneously extruded (using a method of co-extrusion). However, from the viewpoint of exerting better adhesion, the packaging material 10 may preferably be one in which the adhesive layer 14 and the sealant layer 15 are laminated by co-extrusion.

Figure 2:
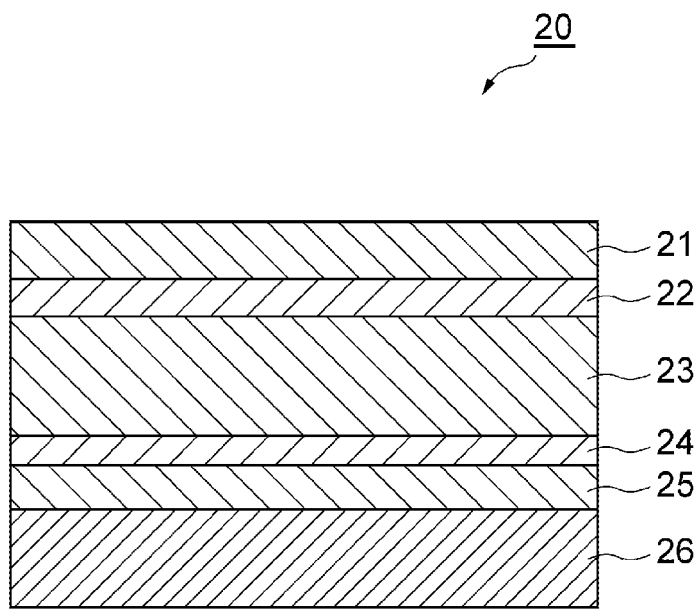
FIG. 2 is a schematic cross-sectional view of a packaging material for a power storage device according to another embodiment of the present invention.

The following description addresses a packaging material for a power storage device 20 according to another embodiment of the present invention (hereinafter, simply referred to as packaging material 20). FIG. 2 is a schematic cross-sectional view of the packaging material for a power storage device according to another embodiment of the present invention. As shown in FIG. 2, the packaging material 20 includes a metal foil layer 23 serving as a barrier function, a coating layer 21 formed on a first surface of the metal foil layer 23 via a first anti-corrosion treatment layer 22, and a second anti-corrosion treatment layer 24 formed on a second surface of the metal foil layer 23, and includes an adhesive layer 25 and a sealant layer 26 sequentially laminated on the second anti-corrosion treatment layer 24. The coating layer 21 may be formed on the first surface of the metal foil layer 23 only via the first anti-corrosion treatment layer 22, or may be formed via the first anti-corrosion treatment layer 22 and an adhesive layer. If no adhesive layer is used for forming the coating layer 21, cost for the adhesive can be saved, and the thickness of the packaging material can be decreased. If an adhesive layer is used, the two-part curable polyurethane adhesive mentioned in the section of the dry laminate configuration of the above adhesive layer 14 can be used as an adhesive configuring the adhesive layer. When forming a power storage device using the packaging material 20, the coating layer 21 is the outermost layer, and the sealant layer 26 is the innermost layer.

The coating layer 21 imparts heat resistance to the packaging material, for heat sealing performed during production of the power storage device, and electrolytic solution resistance for the packaging material to be less prone to deteriorate even when the electrolytic solution is attached thereto, and reduces possible occurrence of pinholes during processing or distribution. The first anti-corrosion treatment layer 22 reduces corrosion of the metal foil layer 23 due to the electrolyte solution, or due to the hydrofluoric acid generated by reaction of the electrolyte solution with moisture, and improves adhesion between the metal foil layer 23 and the coating layer 21. The second anti-corrosion treatment layer 24 reduces corrosion of the metal foil layer 23 due to the electrolyte solution, or due to the hydrofluoric acid generated by reaction of the electrolyte solution with moisture. The adhesive layer 25 bonds the metal foil layer 23 formed with the second anti-corrosion treatment layer 24 to the sealant layer 26. The sealant layer 26 imparts sealability to the packaging material 20 when heat-sealed.

The coating layer 21, the metal foil layer 23, the adhesive layer 25, and the sealant layer 26 of the packaging material 20 may be configured similarly to the coating layer 11, the metal foil layer 12, the adhesive layer 14, and the sealant layer 15, respectively, of the packaging material 10 described above. The first and second anti-corrosion treatment layers 22 and 24 of the packaging material 20 may each be configured similarly to the anti-corrosion treatment layer 13 of the packaging material 10 described above.

[Method of producing single-layer film]

The single-layer film of the coating layer 11 is obtained by applying an active energy ray curable resin composition containing a urethane (meth)acrylate oligomer to a base material layer, such as a stretched polyester film, followed by drying and irradiation of active energy rays to the resultant object to form a cross-linked structure, or by applying a resin material containing a fluorine-based resin to the base material layer, followed by drying and heat treatment to form a cross-linked structure, or by applying a water-dispersed polyurethane resin or polyester resin to the base material layer, followed by drying, and then peeling off the resin material from the base material layer.

[Method of Producing Packaging Material]

In the following, a method of producing a packaging material will be described, taking the packaging material 10 as an example. The following is only an example of a production method, and the method of producing the packaging material of the present embodiment is not limited to the following method.

The method of producing the packaging material 10 includes, for example, the following steps S1 to S3.

Step S1: Forming the anti-corrosion treatment layer 13 on a surface (second surface) of the metal foil layer 12.

Step S2-1: Applying an active energy ray curable resin composition to the other surface (first surface on a side opposite to the second surface) of the metal foil layer 12, followed by drying and irradiation of active energy rays, to thereby form the coating layer 11. The application method is not specifically limited. Various methods, such as gravure coating, reverse coating, roll coating, or bar coating, can be used. After application, the solvent component is dried, followed by irradiating ultraviolet rays with a wavelength of 320 nm or less at a light integral of 500 mJ/cm2, for example, to thereby form the coating layer 11. In the case of the packaging material 20, the coating layer 21 is formed on the first anti-corrosion treatment layer 22 in a similar manner as mentioned above.

Step S2-2: Applying a fluorine-based resin on the other surface of the metal foil layer 12 (first surface on a side opposite to the second surface), followed by drying to thereby form the coating layer 11. The application method is not specifically limited. Various methods, such as gravure coating, reverse coating, roll coating, or bar coating, can be used. After application, the coating layer 11 may be aged at 60° C. for 7 days, for example, to promote curing. In the case of the packaging material 20, the coating layer 21 is formed on the first anti-corrosion treatment layer 22 in a similar manner as mentioned above.

Step S3: Bonding the sealant layer 15 onto the anti-corrosion treatment layer 13 formed on a surface of the metal foil layer 12 via the adhesive layer 14. In the case of the packaging material 20, a step is performed accordingly.

(Step S1)

In Step S1, an anticorrosive agent is applied to a surface of the metal foil layer 12, followed by drying to form the anti-corrosion treatment layer 13. Examples of the anticorrosive agent include a ceria sol treatment anticorrosive agent, the chromate treatment anticorrosive agent, and the like mentioned above. The method of applying the anticorrosive agent is not specifically limited. Various methods, such as gravure coating, reverse coating, roll coating, or bar coating, can be used. In the case of the packaging material 20, the first and second anti-corrosion treatment layers are formed on respective surfaces of the metal foil layer 23 in a similar manner as described above. The order of forming the first and second anti-corrosion treatment layers is not specifically limited.

(Steps S2-1 and S2-2)

In the case of a general-purpose packaging material having a base material layer laminated on the outer side of the metal foil layer, the layers are laminated via an adhesive layer, and hence a step of aging or the like is needed. However, when forming the coating layer 11, the adhesive layer is not needed to be provided between the layers, and the step of aging or the like is not needed in Step S2. As a result, cycle time can be shortened, and production efficiency is considerably improved. Moreover, since an adhesive or the like is not used, cost is greatly reduced as well.

(Step S3)

In Step S3, the adhesive layer 14 is formed on the anti-corrosion treatment layer 13 of a laminate in which the coating layer 11, the metal foil layer 12, and the anti-corrosion treatment layer 13 are laminated in this order. Then, a resin film serving as the sealant layer 15 is bonded to the adhesive layer 14. The sealant layer 15 is preferably laminated by sandwich lamination. In the case of the packaging material 20, a step is performed accordingly.

The packaging material 10 or 20 is obtained through Steps S1 to S3 described above. The order of sequentially performed Steps S1 to S3 in the method of producing the packaging material 10 or 20 is not limited to the order mentioned above. For example, Step S1 may be performed after Step S2-1 or S2-2.

EXAMPLES

In the following, the present invention will be described in more detail by way of Examples. However, the present invention should not be limited by the description below.

[Materials Used for Preparing Packaging Materials]

Materials used for metal foil layers, anti-corrosion treatment layers, adhesive layers, and sealant layers of packaging materials of the Examples and Comparative Examples are set forth below.

(Metal Foil Layer)

Metal foil: Soft aluminum foil 8079 (manufactured by Toyo Aluminum K.K., thickness: 30 µm).

(Anti-corrosion Treatment Layer)

Anticorrosive agent: Coating type ceria sol treatment anticorrosive agent mainly containing ceric oxide, phosphoric acid, and an acrylic resin.

(Adhesive Layer)

Adhesive resin: Polypropylene-based resin graft-modified with maleic anhydride (trade name "Admer", manufactured by Mitsui Chemicals, Inc., thickness: 10 to 20

(Sealant Layer)

Sealant resin: Polypropylene film formed by extrusion (thickness: 10 to 60 µm).

(Coating Layer)

Materials used for coating layers of the Examples and the Comparative Examples are set forth below, together with sealant layers. 10 percent tensile strength of the obtained coating layers or the like was measured by conducting a tensile test in conformity with JIS K 7127 (former JIS K 7113-2) in a measurement environment of 23° C., 50 RH, sample width of 6 mm, gauge length of 35 mm, and tensile speed of 50 mm/min.

TABLE 1

Coating layer

| | Base resin | Curing agent NCO functional group equivalent | Film thickness (µm) | 10 percent tensile strength (N/mm) |
|---|---|---|---|---|
| A-1 | Tetrafluoroethylene-vinyl | 1210 | 5 | 0.240 |
| A-2 | copolymerization resin | 1100 | 5 | 0.264 |
| A-3 | | 2500 | 5 | 0.270 |
| A-4 | | 850 | 7 | 0.385 |
| A-5 | | 5600 | 10 | 0.604 |

| | Resin composition | (Meth)acryloyl group functional group equivalent | Film thickness (µm) | 10 percent tensile strength (N/mm) |
|---|---|---|---|---|
| A-6 | Bifunctional urethane (meth)acrylate (1) | 1020 | 5 | 0.250 |
| A-7 | Bifunctional urethane (meth)acrylate (2) | 750 | 7 | 0.470 |
| A-8 | Hexafunctional urethane (meth)acrylate (1) | 1100 | 5 | 0.372 |
| A-9 | Hexafunctional urethane (meth)acrylate (2) | 2300 | 7 | 0.420 |
| A-10 | Bifunctional urethane (meth)acrylate (3) | 5200 | 10 | 0.150 |

| | Base resin | — | Film thickness (µm) | 10 percent tensile strength (N/mm) |
|---|---|---|---|---|
| A-11 | Polyurethane | — | 10 | 0.602 |
| A-12 | | — | 5 | 0.302 |
| A-13 | | — | 5 | 0.572 |
| A-14 | | — | 20 | 1.235 |
| A-15 | Polyester | — | 8 | 0.523 |

TABLE 1-continued

Adhesive layer/sealant layer

| | Film thickness (µm) | 10 percent tensile strength (N/mm) |
|---|---|---|
| Acid-modified PP/PP (1) | 20 | 0.203 |
| Acid-modified PP/PP (2) | 40 | 0.570 |
| Acid-modified PP/PP (3) | 80 | 1.360 |

[Preparation of Packaging Material]

Examples 1 to 3 and Comparative Examples 1 and 2

Each isocyanate curing agent shown in Table 1 was mixed with a tetrafluoroethylene-vinyl copolymerization resin, as a base resin, at a mol ratio OH/NCO=1. The resin was applied to the first surface of the metal foil layer, and dried at 100° C. for 5 minutes. After application of the resin, the resultant object was aged at 60° C. for 7 days to obtain a cross-linked structure, to thereby form the coating layer.

Subsequently, an adhesive resin was applied onto the anti-corrosion treatment layer formed on a surface (second surface) of the metal foil layer on a side opposite to the surface on which the coating layer was formed, followed by bonding a corona-treated surface of the sealant film to the adhesive-resin coated surface, to thereby form a sealant layer on the anti-corrosion treatment layer via the adhesive layer. The obtained laminate was heated and pressed at 190° C., thereby obtaining each packaging material.

Examples 4 to 5 and Comparative Examples 3 to 5

1-hydroxy-cyclohexyl-phenyl-ketone (Irgacure 184 (trade name) manufactured by BASF SE) was added to each urethane (meth)acrylate oligomer shown in Table 1, at a solid content ratio of 5 mass %, to obtain an active energy ray curable resin composition. A ceria sol treatment anticorrosive agent was applied to a surface (second surface) of the metal foil layer, to form an anti-corrosion treatment layer. The active energy ray curable resin composition was applied onto a surface (first surface) of the metal foil, not the surface having the anti-corrosion treatment layer, by use of a bar coater, followed by heating and drying at 100° C. for 5 minutes, to thereby form a coating layer.

An adhesive resin was applied onto the anti-corrosion treatment layer formed on a surface (second surface) of the metal foil on a side opposite to the surface on which the coating layer was formed, followed by bonding a corona-treated surface of a sealant film to the adhesive-resin coated surface, to thereby form a sealant layer on the anti-corrosion treatment layer via the adhesive layer. The obtained laminate was heated and pressed at 190° C., thereby obtaining each packaging material.

Examples 6 to 9 and Comparative Examples 6 to 7

Water-dispersed polyurethane or polyester was applied onto a surface (first surface) of the metal foil, not the surface formed with the anti-corrosion treatment layer, by use of a bar coater, followed by heating and drying at 150° C. for 5 minutes, to thereby form a coating layer.

An adhesive resin was applied onto the anti-corrosion treatment layer formed on a surface (second surface) of the metal foil on a side opposite to the surface on which the coating layer was formed, followed by bonding a corona-treated surface of a sealant film to the adhesive-resin coated surface, to thereby form a sealant layer on the anti-corrosion treatment layer via the adhesive layer. The obtained laminate was heated and pressed at 190° C., thereby obtaining each packaging material.

[Evaluation of Packaging Materials]

(Formability)

The packaging materials obtained in the Examples and the Comparative Examples were each cut in a 150 mm×190 mm blank, and cold-formed under a forming environment of 23° C. room temperature and −35° C. dew-point temperature, with the forming depth being changed. A punching die and a counter die were used for forming. The punching die had a 100 mm×150 mm size on a plane parallel to the packaging material, and had a 1.5 mm punch corner radius (Rcp) and a 0.75 mm punch shoulder radius (Rp). The counter die had a 0.75 mm die shoulder radius (Rd). Formability was evaluated based on the following criteria. The evaluations are shown in Table 2.

A: Could be deep-drawn to a depth of 4 mm or more without causing breakage or cracks.

B: Could be deep-drawn to a depth of 3 mm or more and less than 4 mm without causing breakage or cracks.

C: Breakage or cracks were caused when deep-drawn to a depth of less than 3 mm.

(Warpage Amount after Forming)

The packaging materials obtained in the Examples and the Comparative Examples were each cut into a 120 mm×260 mm size, and placed in a forming device with the heat sealing resin layer on top. The forming depth of the forming device was set to 3 mm, and the packaging material was cold-formed under an environment of 23° C. room temperature and −35° C. dew-point temperature. The punching die used had a 70 mm×80 mm rectangle cross section, and had a bottom surface with a 0.75 mm punch radius (RP), and a side surface with a 1.5 mm punch corner radius (RCP). The counter die used had an open top surface with a 0.75 mm die radius (RD). A clearance of 0.20 mm was set between the punching die and the counter die. The forming area was taken to be substantially the center of one half of the cut packaging material, one half being defined by a line perpendicularly passing substantially the center of the long side of the packaging material. That is, the forming area was arranged so as to be located at 25 mm from both short-side ends of the cut packaging material. The formed packaging material was left at rest under an environment of 23° room temperature C and −35° C. dew-point temperature for 60 minutes, with the layer to be warped on top. Then, a warpage (distance from the surface left at rest) caused on an edge of the unformed area was measured. The measurements of the warpage are shown in Table 2.

(Electrolytic Solution Resistance)

An electrolytic solution (solvent:ethylene carbonate/dimethyl carbonate/diethyl carbonate=1/1/1; electrolyte: LiPF6 (1 M concentration)) with an addition of a slight trace of water (1,500 ppm) was dropped on the coating layer-(or base material layer-) side surface of each of the packaging materials obtained in the Examples and the Comparative Examples. The packaging materials were left at rest for 24 hours, and then the dropped electrolytic solution was wiped with isopropyl alcohol. After that, the appearances of the areas of the packaging materials where the electrolytic solution was dropped were evaluated based on the following criteria. The evaluations are shown in Table 2.

A: The electrolytic solution-dropped area could not be visually recognized.

B: The outline of the electrolytic solution-dropped area could be visually recognized, with no damage, such as melting, caused.

C: The electrolytic solution-dropped area had damage, such as melting, caused by the electrolytic solution.

TABLE 2

| | Coating layer | Adhesive layer/ sealant layer | Adhesive layer + sealant layer film thickness/ coating layer thickness | Tensile strength difference (N/mm) | Formability | Warpage (mm) | Electrolyte resistance |
|---|---|---|---|---|---|---|---|
| Example 1 | A-1 | Acid-modified PP/PP (2) | 8 times | 0.330 | A | 8.6 | A |
| Example 2 | A-2 | Acid-modified PP/PP (2) | 8 times | 0.306 | A | 8.0 | A |
| Example 3 | A-3 | Acid-modified PP/PP (2) | 8 times | 0.300 | A | 7.8 | B |
| Example 4 | A-6 | Acid-modified PP/PP (2) | 8 times | 0.320 | B | 8.4 | A |
| Example 5 | A-8 | Acid-modified PP/PP (2) | 8 times | 0.198 | A | 5.2 | A |
| Example 6 | A-11 | Acid-modified PP/PP (1) | 2 times | 0.399 | A | 9.9 | A |
| Example 7 | A-12 | Acid-modified PP/PP (2) | 8 times | 0.268 | A | 6.5 | A |
| Example 8 | A-13 | Acid-modified PP/PP (2) | 5 times | 0.002 | A | 1.3 | A |
| Example 9 | A-15 | Acid-modified PP/PP (2) | 5 times | 0.047 | A | 2.1 | A |
| Comparative Example 1 | A-4 | Acid-modified PP/PP (3) | 11.4 times | 0.975 | C | 25.4 | A |
| Comparative Example 2 | A-5 | Acid-modified PP/PP (3) | 8 times | 0.756 | A | 19.7 | C |
| Comparative Example 3 | A-7 | Acid-modified PP/PP (3) | 11.4 times | 0.890 | C | 23.2 | A |

TABLE 2-continued

|  | Coating layer | Adhesive layer/ sealant layer | Adhesive layer + sealant layer film thickness/ coating layer thickness | Tensile strength difference (N/mm) | Formability | Warpage (mm) | Electrolyte resistance |
|---|---|---|---|---|---|---|---|
| Comparative Example 4 | A-9 | Acid-modified PP/PP (3) | 11.4 times | 0.940 | A | 24.5 | A |
| Comparative Example 5 | A-10 | Acid-modified PP/PP (2) | 4 times | 0.420 | A | 11.0 | C |
| Comparative Example 6 | A-14 | Acid-modified PP/PP (1) | 1 times | 1.032 | A | 24.2 | A |
| Comparative Example 7 | A-13 | Acid-modified PP/PP (3) | 10 times | 0.788 | A | 22.4 | A |

*Tensile strength difference: Strength difference between the coating layer and the laminate of the adhesive layer and the sealant layer at 10 percent stretch As shown in Tables 1 and 2, in the Examples completely meeting the configuration of the present invention, warpage after forming was within 10 mm, and thus warpage was reduced. These Examples also exhibited good formability and good electrolytic solution resistance.

REFERENCE SIGNS LIST 10, 20 . . . Packaging material (packaging material for a power storage device) 11, . . . Coating layer, 12 . . . Metal foil layer, 13 . . . Anti-corrosion treatment layer, 14 . . . Adhesive layer, 15 . . . Sealant layer, 21 . . . Coating layer, 22 . . . First anti-corrosion treatment layer, 23 . . . Metal foil layer, 24 . . . Second anti-corrosion treatment layer, 25 . . . Adhesive layer, 26 . . . Sealant layer

What is claimed is:

1. A packaging material for a power storage device, comprising:
a metal foil layer;
a coating layer formed on a first surface of the metal foil layer directly or with a first anti-corrosion treatment layer intermediate the coating layer and the metal foil layer;
a second anti-corrosion treatment layer formed on a second surface of the metal foil layer;
an adhesive layer formed on the second anti-corrosion treatment layer; and
a sealant layer formed on the adhesive layer, wherein:
the coating layer contains fluorine-based resins, wherein the fluorine-based resins is a tetrafluoro fluororesin cured with an isocyanate curing agent, and an isocyanate group (—NCO) functional group equivalent per molecule of the curing agent is in a range of 1,000 to 5,000; and
a strength difference between the coating layer and a laminate of the adhesive layer and the sealant layer at a 10 percent stretch conducted in a tensile test (in conformity with JIS K 7127) being less than 0.400 N/mm.

2. The packaging material for a power storage device of claim 1, wherein the coating layer has a thickness in a range of 3 to 30 μm.

3. The packaging material for a power storage device of claim 1, wherein the sealant layer is made of a polyolefin-based resin.

4. The packaging material for a power storage device of claim 1, wherein a total thickness of the adhesive layer and the sealant layer is two to eight times the thickness of the coating layer.

* * * * *